(12) United States Patent
Onishi (10) Patent No.: US 11,074,684 B2
(45) Date of Patent: Jul. 27, 2021

(54) INSPECTION APPARATUS AND INSPECTION METHOD

(71) Applicant: SCREEN HOLDINGS CO., LTD., Kyoto (JP)

(72) Inventor: Hiroyuki Onishi, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 16/619,383

(22) PCT Filed: May 14, 2018

(86) PCT No.: PCT/JP2018/018597
§ 371 (c)(1),
(2) Date: Dec. 4, 2019

(87) PCT Pub. No.: WO2018/225460
PCT Pub. Date: Dec. 13, 2018

(65) Prior Publication Data
US 2020/0151863 A1    May 14, 2020

(30) Foreign Application Priority Data

Jun. 5, 2017    (JP) .............................. JP2017-110904

(51) Int. Cl.
*G06T 7/00* (2017.01)
*G06T 5/50* (2006.01)

(52) U.S. Cl.
CPC ................ *G06T 7/001* (2013.01); *G06T 5/50* (2013.01)

(58) Field of Classification Search
CPC .................................. G06T 7/001; G06T 5/50
See application file for complete search history.

(56) References Cited

U.S. PATENT DOCUMENTS 6,922,483 B2 * 7/2005 Doane ................ G02B 26/0841
        348/383
7,620,232 B2 * 11/2009 Sakai ...................... G06T 7/001
        382/141

(Continued)

FOREIGN PATENT DOCUMENTS

JP      11-257937 A     9/1999
JP      2003-065969 A   3/2003

(Continued)

OTHER PUBLICATIONS

Notification Concerning Transmittal of the International Preliminary Report on Patentability issued in corresponding International Patent Application No. PCT/JP2018/018597, dated Dec. 19, 2019, 6 pages.

(Continued)

*Primary Examiner* — Gregory M Desire
(74) *Attorney, Agent, or Firm* — McDermott Will & Emery LLP (57) ABSTRACT

A high-frequency component removing part removes high-frequency components from a first object image obtained by picking up an image of an object and a first reference image, to acquire a second object image and a second reference image, respectively. A correction part corrects a value of each pixel of at least one of the first object image and the first reference image on the basis of a discrepancy, which is a ratio or a difference, between a value of the corresponding pixel of the second object image and a value of the corresponding pixel of the second reference image. A comparison part compares the first object image with the first reference image, to thereby detect a defect area in the first object image.

14 Claims, 11 Drawing Sheets

(56) References Cited

U.S. PATENT DOCUMENTS

| | | | | |
|---|---|---|---|---|
| 7,676,110 | B2* | 3/2010 | Steinberg | H04N 5/217 382/275 |
| 8,270,700 | B2* | 9/2012 | Sakai | G06T 7/001 382/141 |
| 9,041,854 | B2* | 5/2015 | Kiyosawa | H04N 5/367 348/347 |
| 2006/0067571 | A1 | 3/2006 | Onishi | |
| 2008/0088830 | A1* | 4/2008 | Serikawa | G01N 21/958 356/237.2 |
| 2013/0002849 | A1* | 1/2013 | Sakai | G06T 7/001 348/86 |
| 2013/0248709 | A1* | 9/2013 | Yamamoto | G06T 7/001 250/309 |
| 2017/0169554 | A1* | 6/2017 | Karlinsky | G06K 9/621 |
| 2017/0307544 | A1 | 10/2017 | Nagata | |
| 2018/0039830 | A1 | 2/2018 | Ishiyama et al. | |
| 2019/0096057 | A1* | 3/2019 | Allen | G06T 7/0008 |
| 2020/0151863 | A1* | 5/2020 | Onishi | G06T 7/001 |

FOREIGN PATENT DOCUMENTS

| | | |
|---|---|---|
| JP | 2003-098113 A | 4/2003 |
| JP | 2006-098163 A | 4/2006 |
| JP | 2010-066153 A | 3/2010 |
| JP | 2015-148447 A | 8/2015 |
| JP | 2016-061651 A | 4/2016 |
| WO | 2016/035381 A1 | 3/2016 |
| WO | 2016/136900 A1 | 9/2016 |

OTHER PUBLICATIONS

Translation of the International Preliminary Report on Patentability issued in corresponding International Patent Application No. PCT/JP2018/018597, dated Dec. 19, 2019, 7 pages.

International Search Report issued in corresponding International Patent Application No. PCT/JP2018/018597, dated Jun. 12, 2018, with English translation.

Japanese Decision to Grant a Patent issued in corresponding Japanese Patent Application No. 2017-110904, dated Mar. 9, 2020, with English translation.

Extended European Search Report issued in corresponding European Patent Application No. 18813762.4-1230, dated Feb. 10, 2021.

* cited by examiner

| 10 | 10 | 10 | 10 | 10 |
|----|----|----|----|----|
| 10 | 15 | 15 | 15 | 15 |
| 15 | 15 | 40 | 15 | 15 |
| 20 | 20 | 20 | 20 | 20 |
| 20 | 25 | 25 | 25 | 25 |

| 30 | 30 | 30 | 30 | 30 |
|----|----|----|----|----|
| 30 | 30 | 30 | 30 | 30 |
| 30 | 30 | 30 | 30 | 30 |
| 30 | 30 | 30 | 30 | 30 |
| 30 | 30 | 30 | 30 | 30 |

| 20 | 20 | 20 | 20 | 20 |
|----|----|----|----|----|
| 20 | 15 | 15 | 15 | 15 |
| 15 | 15 | 10 | 15 | 15 |
| 10 | 10 | 10 | 10 | 10 |
| 10 | 5  | 5  | 5  | 5  |

| | | | | |
|---|---|---|---|---|
| | 16 | 16 | 16 | |
| | 19 | 19 | 19 | |
| | 22 | 23 | 23 | |
| | | | | |

| | | | | |
|---|---|---|---|---|
| | 1 6 | 1 6 | 1 6 | — 83 |
| | 1 9 | 1 9 | 1 9 | |
| | 2 2 | 2 3 | 2 3 | |
| | | | | |

| | | | | |
|---|---|---|---|---|
| | 1 | 1 | 1 | — 83 |
| | 4 | 2 1 | 4 | |
| | 2 | 3 | 3 | |
| | | | | |

FIG. 20

INSPECTION APPARATUS AND INSPECTION METHOD

CROSS REFERENCE TO RELATED APPLICATIONS

This application is the U.S. National. Phase under 35 U.S.C. § 371 of International Application No. PCT/JP2018/018597, filed on May 14, 2018, which claims the benefit of Japanese Application No. 2017-110904, filed on Jun. 5, 2017, The entire contents of each are hereby incorporated by reference.

TECHNICAL FIELD

The present invention relates to an inspection apparatus and an inspection method for detecting a defect area indicating a defect of an object from an object image by comparing the object image with a reference image.

BACKGROUND ART

Conventionally, in various fields, detection of a defect on an object has been performed by comparing an object image which is an image showing an object with a reference image which is prepared in advance. In a method termed "shaking comparison", for example, detection of a defect is performed by comparing respective pixel values of the object image and the reference image while slightly changing a relative position between these images. Further, in the fourth preferred embodiment (see FIG. 14) in Japanese Patent Application Laid-Open No. 2006-98163, after applying a filter on the reference image and an inspection image, obtained is a differential absolute value image of the reference image and the inspection image. The differential absolute value image is binarized. The filter is suited to a defect check condition for each inspection area, and a binary defect area image is obtained for each inspection area with different detection conditions.

Though the method of detecting a defect by comparison between the object image and the reference image is general, when there is a slight difference in the surface condition (including a surface shape; the same applies to the following) in some areas among a plurality of objects, in some cases, there arises a large difference in the brightness of the area among the object images. For example, in a case where there is a difference in the roughness of a shot-blasted surface among individuals, another case where the tint and/or shape of a surface on which additional shotblasting is partially performed is slightly changed, or the like case, there appears an area of false defect in a differential image between the object image and the reference image.

SUMMARY OF INVENTION

The present invention is intended for an inspection apparatus, and it is an object of the present invention to detect a defect with high accuracy even if a surface condition of an object is changed.

The inspection apparatus according to one preferred embodiment of the present invention includes an object image storage part for storing therein a first object image obtained by picking up an image of an object, a reference image storage part for storing therein a first reference image, a high-frequency component removing part for removing high-frequency components from the first object image and the first reference image, to thereby acquire a second object image and a second reference image, respectively, and a comparison part for correcting a value of each pixel of at least one of the first object image and the first reference image on the basis of a discrepancy, which is a ratio or a difference, between a value of the corresponding pixel of the second object image and a value of the corresponding pixel of the second reference image, and comparing the first object image with the first reference image, to thereby detect a defect area in the first object image.

By the present invention, it is possible to detect a defect with high accuracy even if a surface condition of the object is changed.

Preferably, an inspection area on the object, in which a defect is to be detected, is a roughened surface having a gloss.

More preferably, the inspection area is a shot-blasted or ground metal surface.

In one preferred embodiment, the number of detection processing areas, each corresponding to the inspection area, in the first object image is two or more, and there is a difference in the property of removal of high-frequency components between at least two detection processing areas, which is performed by the high-frequency component removing part.

Preferably, the high-frequency component removing part removes high-frequency components from each detection processing area by applying a filter on the each detection processing area, and the size of the filter becomes smaller as an angle formed by a direction of luminous flux of illumination light going to the inspection area and the direction of the normal of the inspection area becomes larger.

The present invention is also intended for an inspection method. The inspection method according to the present invention includes a) obtaining a first object image by picking up an image of an object, b) acquiring a second object image and a second reference image by removing high-frequency components from the first object image and a first reference image, respectively, c) correcting a value of each pixel of at least one of the first object image and the first reference image on the basis of a discrepancy, which is a ratio or a difference, between a value of the corresponding pixel of the second object image and a value of the corresponding pixel of the second reference image, and d) detecting a defect area in the first object image by comparing the first object image with the first reference image.

These and other objects, features, aspects and advantages of the present invention will become more apparent from the following detailed description of the present invention when taken in conjunction with the accompanying drawings.

DESCRIPTION OF EMBODIMENTS

Figure 1:
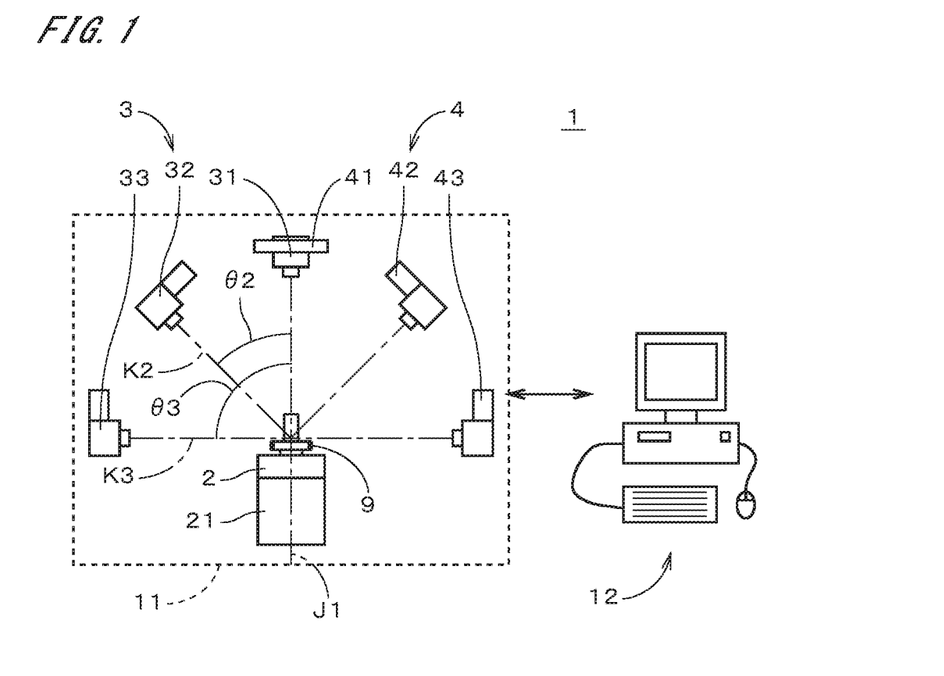
FIG. 1 is a view showing a configuration of an inspection apparatus.
Figure 2:
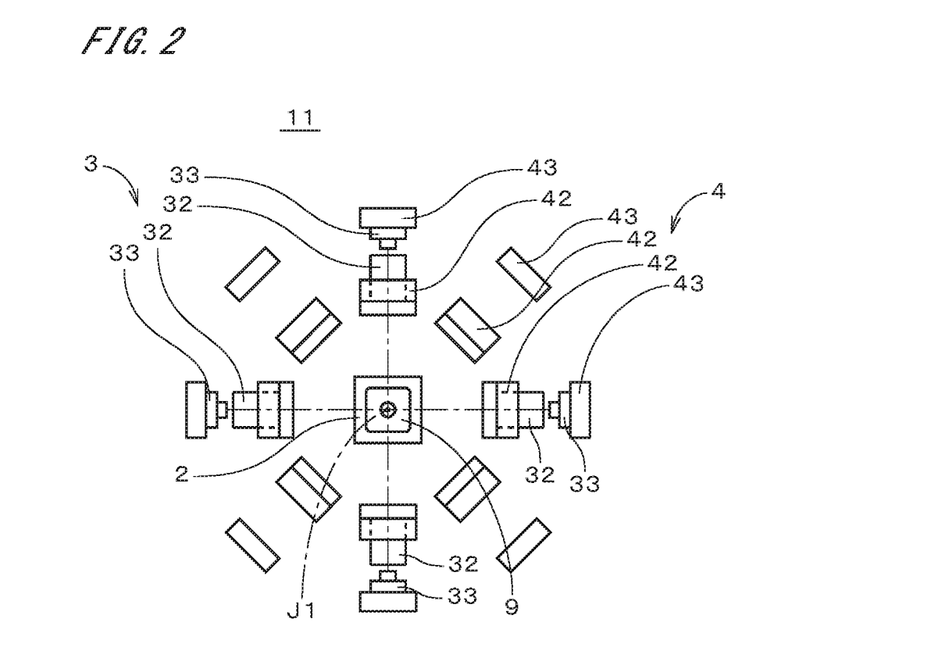
FIG. 2 is a plan view showing a main body of the inspection apparatus.

FIG. 1 is a view showing a configuration of an inspection apparatus 1 in accordance with one preferred embodiment of the present invention. FIG. 2 is a plan view showing a main body 11 of the inspection apparatus 1. The inspection apparatus 1 is an apparatus for inspecting an appearance of a three-dimensional object 9 having a gloss on its surface. The object 9 is, for example, a metal component formed by forging and/or casting, and has a satin-finished surface with microscopic projections and depressions thereon, which are made by processing such as shotblasting or the like. The object 9 is, for example, one of various components (a shaft, an outer ring, a yoke, and the like of a cylindrical hub) used for universal joint. The shape of the object 9 shown in FIG. 1 is only one example.

As shown in FIG. 1, the inspection apparatus 1 includes a main body 11 and a computer 12. The main body 11 includes a stage 2, a stage rotation part 21, an image pickup unit 3, and a light source unit 4. The object 9 is placed on the stage 2. The stage rotation part 21 rotates the object 9 together with the stage 2 about a central axis J1 oriented in a vertical direction at a predetermined angle. The central axis J1 goes through the center of the stage 2. The main body 11 is provided with a light shielding cover (not shown) which prevents external light from arriving on the stage 2, and the stage 2, the image pickup unit 3, and the light source unit 4 are provided within the light shielding cover.

As shown in FIGS. 1 and 2, the image pickup unit 3 includes one upper image pickup part 31, four oblique image pickup parts 32, and four side image pickup parts 33. In FIG. 2, the upper image pickup part 31 is not shown (an upper light source part 41 described later is also not shown). The upper image pickup part 31 is disposed above the stage 2 on the central axis J1. By using the upper image pickup part 31, it is possible to acquire an image of the object 9 on the stage 2, which is picked up from directly above.

As shown in FIG. 2, when the main body 11 is viewed from above with a downward line of sight (in other words, when the main body 11 is planarly viewed), the four oblique image pickup parts 32 are arranged around the stage 2. The four oblique image pickup parts 32 are arranged circumferentially about the central axis J1 at an angular interval (pitch) of 90 degrees. In a plane including an imaging optical axis K2 of each oblique image pickup part 32 and the central axis J1 (see FIG. 1), an angle θ2 between the imaging optical axis K2 and the central axis J1 is about 45 degrees. By using each of the oblique image pickup parts 32, it is possible to acquire an image of the object 9 on the stage 2, which is picked up from diagonally upward.

When the main body 11 is planarly viewed, the four side image pickup parts 33 are also arranged around the stage 2 as with the four oblique image pickup parts 32. The four side image pickup parts 33 are arranged circumferentially at an angular interval of 90 degrees. In a plane including an imaging optical axis K3 of each side image pickup part 33 and the central axis J1, an angle θ3 between the imaging optical axis K3 and the central axis J1 is about 90 degrees. By using each of the side image pickup parts 33, it is possible to acquire an image of the object 9 on the stage 2, which is picked up from a side. The upper image pickup part 31, the oblique image pickup part 32, and the side image pickup part 33 each have, for example, a CCD (Charge Coupled Device), a CMOS (Complementary Metal-Oxide Semiconductor), or the like, and can acquire multi-gradation images. The upper image pickup part 31, the oblique image pickup parts 32, and the side image pickup parts 33 are supported by a supporting part (not shown).

The light source unit 4 includes one upper light source part 41, eight oblique light source parts 42, and eight side light source parts 43. The upper light source part 41 is a light source part in which a plurality of LEDs (light emitting diodes) are arranged like a ring around the central axis J1. The ring-like upper light source part 41 is so fixed to the upper image pickup part 31 as to surround the circumference of the upper image pickup part 31. By using the upper light source part 41, it is possible to irradiate the object 9 on the stage 2 with light along a direction parallel with the central axis J1 from directly above.

When the main body 11 is planarly viewed, the eight oblique light source parts 42 are arranged around the stage 2. The eight oblique light source parts 42 are arranged circumferentially at an angular interval of 45 degrees. Each of the oblique light source parts 42 is a light source part in which a plurality of LEDs are arranged like a bar extending in the direction of the tangent of a circumference about the central axis J1. Assuming that a line connecting a center of a light outgoing surface of each oblique light source part 42 and (a center of) the object 9 is termed "lighting axis", in a plane including the lighting axis of the oblique light source part 42 and the central axis J1, an angle between the lighting axis and the central axis J1 is about 45 degrees. By using each oblique light source part 42, it is possible to irradiate the object 9 on the stage 2 with light along the lighting axis from diagonally upward. In the inspection apparatus 1, out of the eight oblique light source parts 42, four oblique light source parts 42 are fixed to the four oblique image pickup parts 32, respectively, and the remaining four oblique light source parts 42 are supported by the not-shown supporting part.

When the main body 11 is planarly viewed, the eight side light source parts 43 are arranged around the stage 2. The eight side light source parts 43 are arranged circumferentially at an angular interval of 45 degrees. Each of the side light source parts 43 is a light source part in which a plurality of LEDs are arranged like a bar extending in the direction of the tangent of a circumference about the central axis J1. Assuming that a line connecting a center of a light outgoing surface of each side light source part 43 and the object 9 is termed "lighting axis" like in the case of the oblique light source part 42, in a plane including the lighting axis of the side light source part 43 and the central axis J1, an angle between the lighting axis and the central axis J1 is about 90 degrees. By using each side light source part 43, it is possible to irradiate the object 9 on the stage 2 with light along the lighting axis from a side. In the inspection apparatus 1, out of the eight side light source parts 43, four side light source parts 43 are fixed to the four side image pickup parts 33, respectively, and the remaining four side light source parts 43 are supported by the not-shown supporting part.

For example, a distance between the object 9, and the upper image pickup part 31 and the upper light source part 41 is about 55 cm (centimeters). Further, a distance between the object 9, and the oblique image pickup part 32 and the oblique light source part 42 is about 50 cm, and a distance between the object 9, and the side image pickup part 33 and the side light source part 43 is about 40 cm. In the upper light source part 41, the oblique light source parts 42, and the side light source parts 43, some types of light sources other than the LED may be used.

Figure 3:
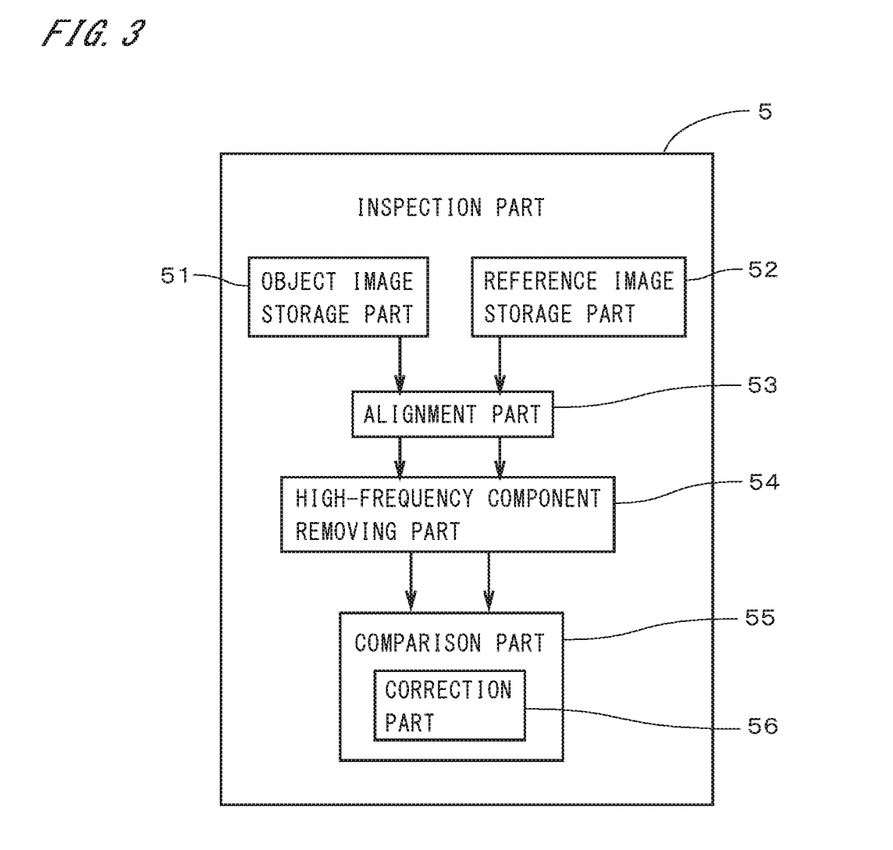
FIG. 3 is a block diagram showing part of a functional constitution implemented by a computer.

FIG. 3 is a block diagram showing part of a functional constitution implemented by the computer 12. The computer 12 includes an inspection part 5. The inspection part 5 includes an object image storage part 51, a reference image storage part 52, an alignment part 53, a high-frequency component removing part 54, and a comparison part 55. The object image storage part 51 stores therein an image (hereinafter, referred to as an "object image") of the object 9, which is obtained by image pickup performed by the image pickup parts in the image pickup unit 3. The object image is thereby prepared. The reference image storage part 52 stores therein an image (hereinafter, referred to as a "reference image") of the object 9, which is obtained by the same image pickup parts as used for the image pickup of the object image and has no defect. More exactly, the object image storage part 51 stores therein data of the object image and the reference image storage part 52 stores therein data of the reference image. In the following description, the processing on the images is computation on the data of the images, to be exact.

The alignment part 53 performs an alignment between the object image and the reference image. For the alignment between the object image and the reference image performed by the alignment part 53, various methods may be adopted. There may be a method, for example, in which the object image and the reference image are overlaid at various relative positions and a position at which the sum total of differential absolute values of pixel values of these images becomes minimum is obtained as a relative position of these images after the alignment. Further, if the arrangement of the object 9 is made with high accuracy, the alignment between the object image and the reference image may be omitted.

The high-frequency component removing part 54 removes high-frequency components of spatial frequencies from the object image and the reference image. For example, the high-frequency component removing part 54 applies a filter for removing the high-frequency components, such as an average filter, a median filter, a smoothing filter, or the like having a large size, on the object image and the reference image. Specifically, an average value, a median, a weighted average value, or the like of a pixel value in a certain range around a specified pixel is replaced with a pixel value of the specified pixel. The size of each of these filters is larger than that of an area in which a possible defect appears, and the sizes of length and width are not smaller than three times those of a defect area, and preferably not smaller than five times. The high-frequency component removing part 54 may use a Fourier transform. In this case, for example, the high-frequency component removing part 54 performs a Fourier transform of the image, removes the high-frequency components, and then performs an inverse Fourier transform.

The comparison part 55 includes a correction part 56. The correction part 56 corrects the object image or the reference image. The comparison part 55 compares these images after the correction, to thereby acquire a defect detection image. The computer 12 also serves as a control part which performs general control of the inspection apparatus 1.

Figure 4:
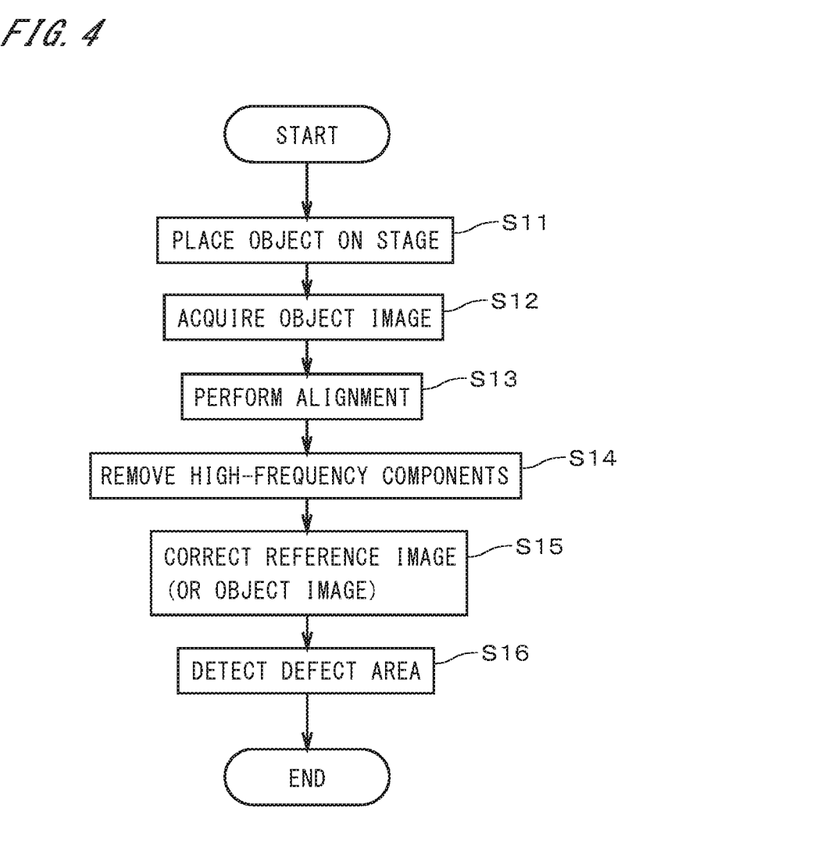
FIG. 4 is a flowchart showing an operation flow of inspection.

FIG. 4 is a flowchart showing an operation flow of inspection performed on the object 9 by the inspection apparatus 1. First, the object 9 to be inspected is placed on the stage 2 (Step S11). On the stage 2, provided are, for example, a plurality of pins for alignment, and by bringing predetermined portions of the object 9 into contact with the plurality of pins, the object 9 is disposed on a predetermined position of the stage 2 (ideally) in a predetermined orientation.

Next, by the control of the computer 12, while a lighting condition is changed by changing the light source part being lighted, image pickup is performed by a selected image pickup part (Step S12). Actually, a plurality of image pickup parts perform image pickup with one lighting condition. With this operation, acquired are a large number of object images that capture the object 9 from various directions with various lighting conditions.

The data of the picked-up object image are stored into the object image storage part 51. In the reference image storage part 52, as described earlier, the data of the reference image corresponding to each picked-up image are prepared. The reference image shows the object 9 with no defect under the same lighting condition as the picked-up image is acquired. The data of the reference image may be acquired by picking up an image of the object 9 with no defect or acquired as data of an average image of respective images of many objects 9. The data of the object image may be generated from design data of the object 9. The object image and the reference image are multi-gradation images.

After the object image is acquired, the alignment part 53 performs an alignment between the object image and the reference image (Step S13). With this operation, determined is a pixel of the reference image, which corresponds to each pixel of the object image. Further, when respective magnifications of the object image and the reference image are different from each other, enlargement or reduction of the object image or the reference image may be performed. If the alignment between the object image and the reference image is not needed, Step S13 may be omitted.

The high-frequency component removing part 54 removes high-frequency components from the object image and the reference image (Step S14). Hereinafter, the object image and the reference image before the removal of high-frequency components are referred to as a "first object image" and a "first reference image", respectively, and the object image and the reference image after the removal of high-frequency components are referred to as a "second object image" and a "second reference image", respectively.

Into the comparison part 55, inputted are data of the first object image, the first reference image, the second object image, and the second reference image. The correction part 56 divides a value of each pixel of the second object image by a value of the corresponding pixel of the second reference image, to thereby generate a ratio image having a ratio as a value of the corresponding pixel. The correction part 56 multiplies a value of each pixel of the first reference image by a value of the corresponding pixel of the ratio image, to thereby correct the first reference image (Step S15).

The comparison part 55 obtains a differential absolute value between a value of each pixel of the first object image and a value of the corresponding pixel of the corrected first reference image, to thereby acquire a differential absolute value image having the differential absolute value as a value of the corresponding pixel. The differential absolute value image is binarized by a predetermined threshold value and a binary defect detection image is thereby acquired (Step S16). For example, a value of a pixel having the differential absolute value not smaller than the threshold value is brought to "1" and values of the other pixels are brought to "0", and in the defect detection image, the defect area is represented as an area having a pixel value of "1".

With reference to FIGS. 5 to 12, a difference between a case where the differential absolute value image between the first object image and the uncorrected first reference image is acquired and another case where Steps S14 to S16 are executed will be described. In these figures, the first object image and the first reference image are simplified.

Figure 5:
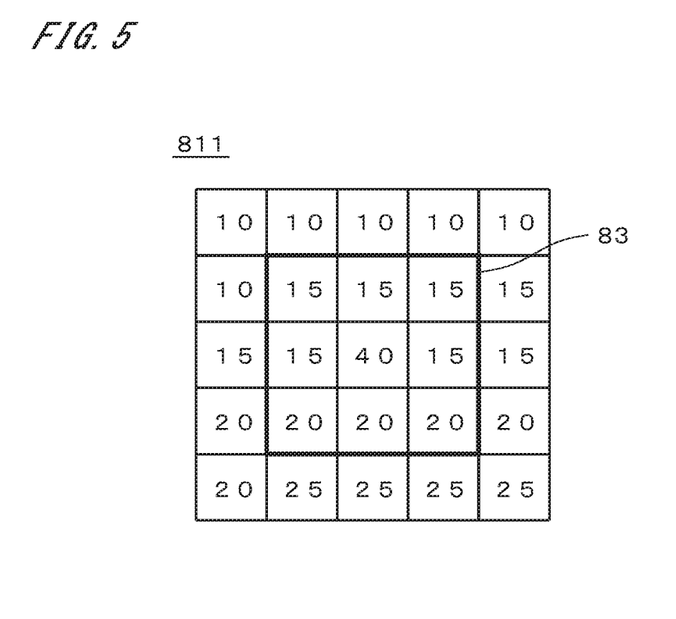
FIG. 5 is a view showing a first object image.
Figure 6:
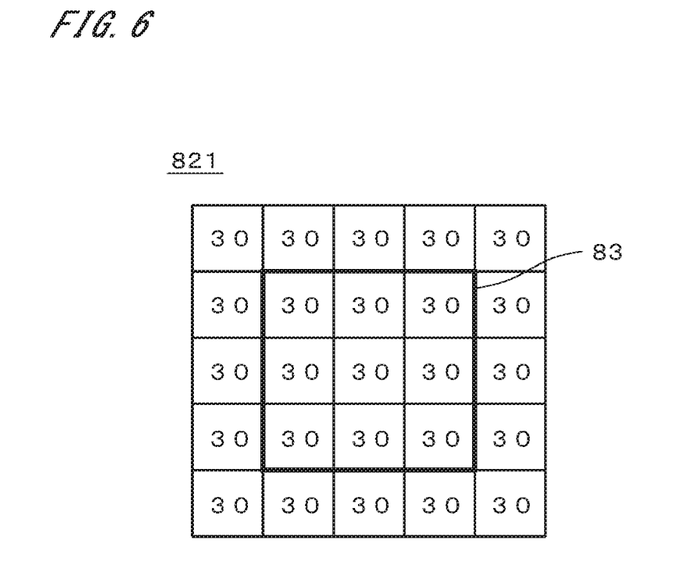
FIG. 6 is a view showing a first reference image.
Figure 7:
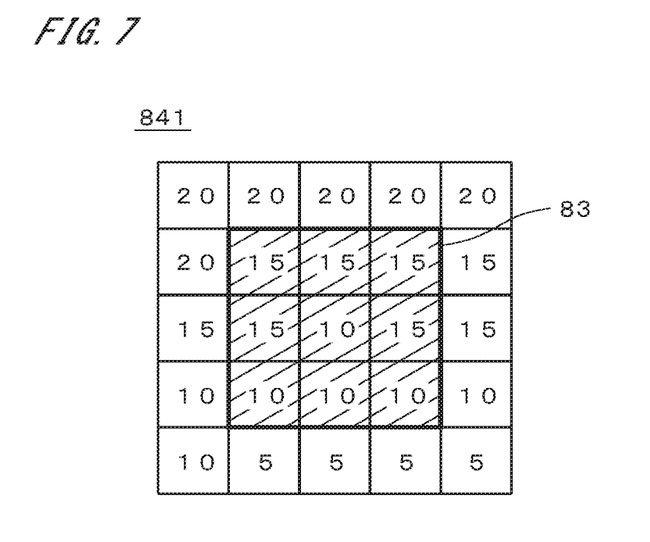
FIG. 7 is a view showing a differential image.

FIG. 5 is a view showing a first object image 811 having 5×5 pixels. Each box represents a pixel and a value inside the box represents a pixel value. A thick line 83 represents a detection processing area which is an area having 3×3 pixels and a target to be defect-detected. In the first object image 811, it is assumed that a defect on the object 9 appears in the center pixels. Further, in the first object image 811, it is also assumed that there is a spatially gentle change in the luminance value on the whole, i.e., a change in the pixel value. The phrase "spatially gentle change" means that a pixel value is changed gently with respect to a positional change in the image. FIG. 6 is a view showing a first reference image 821 having 5×5 pixels, like in FIG. 5. All the pixel values in the first reference image 821 are each "30". FIG. 7 is a view showing a differential absolute value image 841 between the first object image 811 and the first reference image 821.

Herein, in order to detect the center pixels as a defect area in FIGS. 5 and 6, it is necessary to set a threshold value for the differential absolute value image 841 to "10" and in this case, as indicated by parallel hatch lines in FIG. 7, the entire detection processing area 83 is detected as the defect area.

Figure 8:
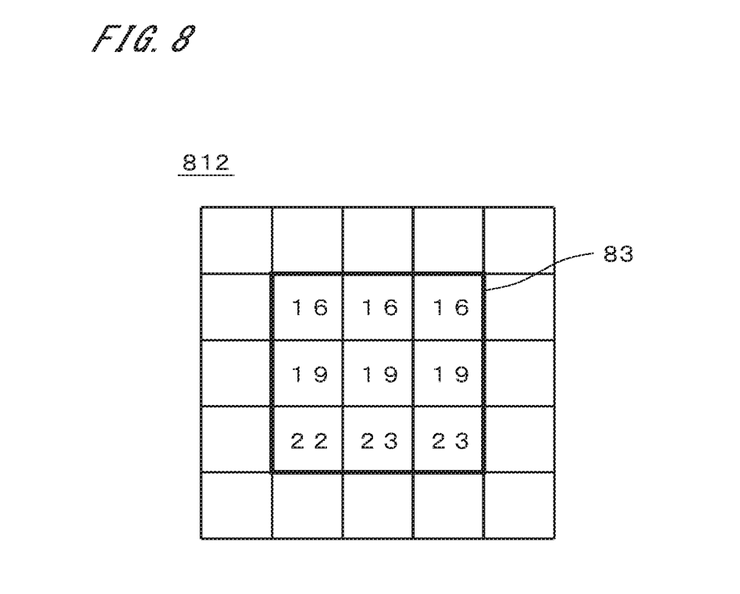
FIG. 8 is a view showing a second object image.
Figure 9:
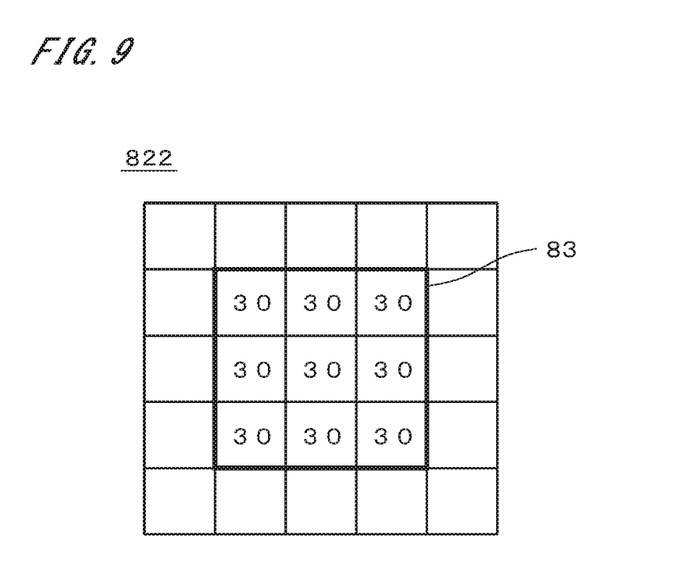
FIG. 9 is a view showing a second reference image.
Figure 10:
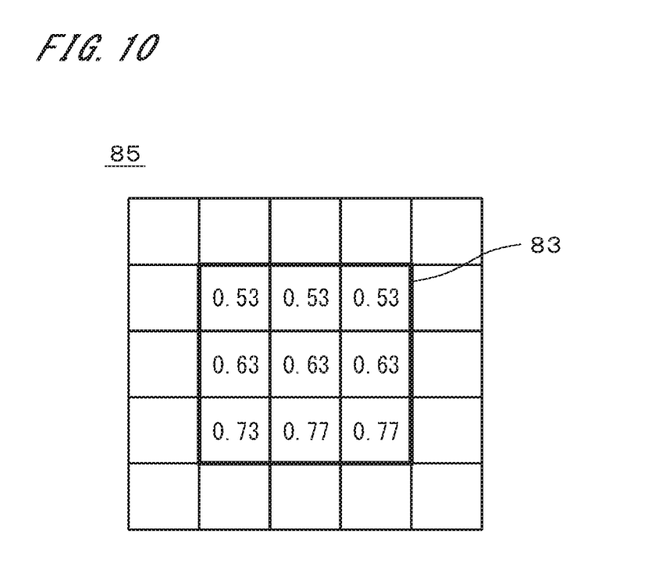
FIG. 10 is a view showing a ratio image.
Figure 11:
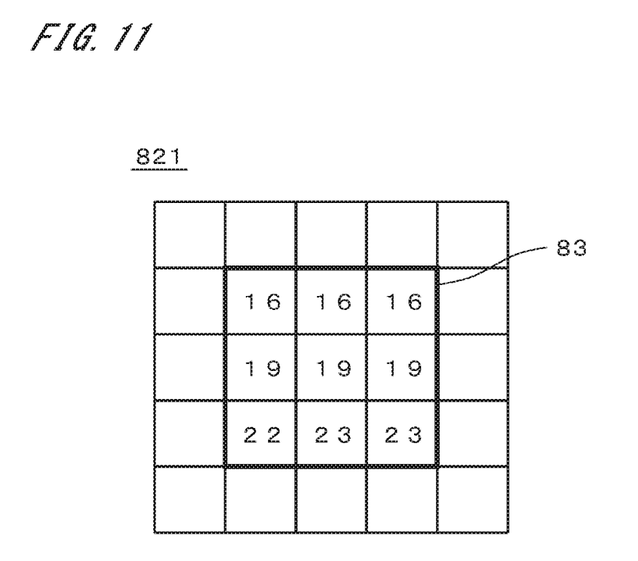
FIG. 11 is a view showing a corrected first reference image.

On the other hand, in the process of Steps S14 to S16, when it is assumed that a moving average filter having 3×3 pixels is used in Step S14, the second object image 812 shown in FIG. 8 is acquired from the first object image 811 and the second reference image 822 shown in FIG. 9 is acquired from the first reference image 821. In Step S15, a value of each pixel of the second object image 812 is divided by a value of the corresponding pixel of the second reference image 822, and a ratio image 85 shown in FIG. 10, which has a ratio of the respective pixel values of these images as the value of the corresponding pixel, is thereby acquired. Further, a value of each pixel of the first reference image 821 is multiplied by a value of the corresponding pixel of the ratio image 85, and the corrected first reference image 821 shown in FIG. 11 is thereby acquired.

Figure 12:
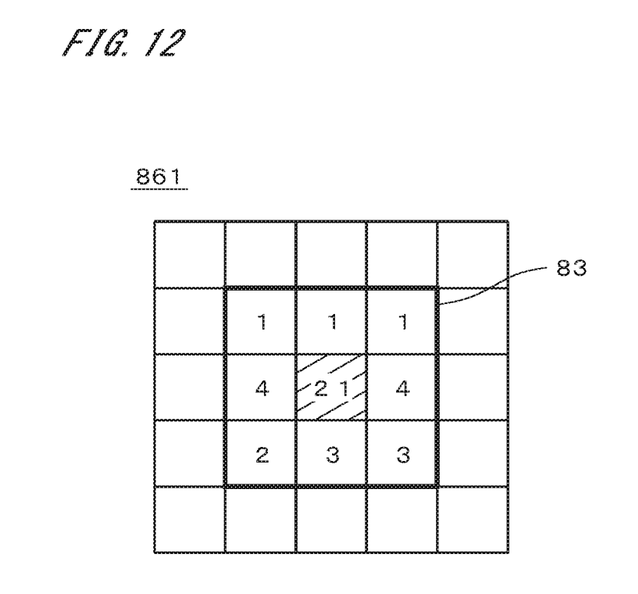
FIG. 12 is a view showing a differential image.

In Step S16, as shown in FIG. 12, acquired is a differential absolute value image 861 having a differential absolute value between a value of each pixel of the first object image 811 and a value of the corresponding pixel of the corrected first reference image 821 as a value of the corresponding pixel. Herein, when the threshold value is "10", out of the detection processing area 83, only the hatched center pixel is acquired as the defect area. Further, a range of the threshold value which enables appropriate detection is widened to 5 to 21. By executing Steps S14 to S16, in the differential absolute value image 861, a pixel corresponding to the defect appears, floating up out of the surrounding pixels. As a result, it is possible to achieve detection of the defect with high accuracy even if the surface condition of the object 9 is changed to cause a spatially gentle change in the brightness or cause a change in the tint on the whole in the first object image 811. As described earlier, herein, the "surface condition" includes a "surface shape". In other words, even if the object image or the reference image is gently changed partially or on the whole, it is possible to suppress over-detection by eliminating the difference due to the gentle change as much as possible and to detect a really fine defect. Particularly, it is possible to detect a defect with high accuracy without changing the first reference image 821.

Though a value of each pixel of the second object image 812 is divided by a value of the corresponding pixel of the second reference image 822 in the above-described exemplary case, a value of each pixel of the second reference image 822 is divided by a value of the corresponding pixel of the second object image 812. In this case, a value of each pixel of the first object image 811 is multiplied by a value of the corresponding pixel of the ratio image, and the first object image 811 is thereby corrected. The correction in Step S15 is processing to match the pixel value of the first object image 811 or the first reference image 821 in the low-frequency level.

Figure 13:
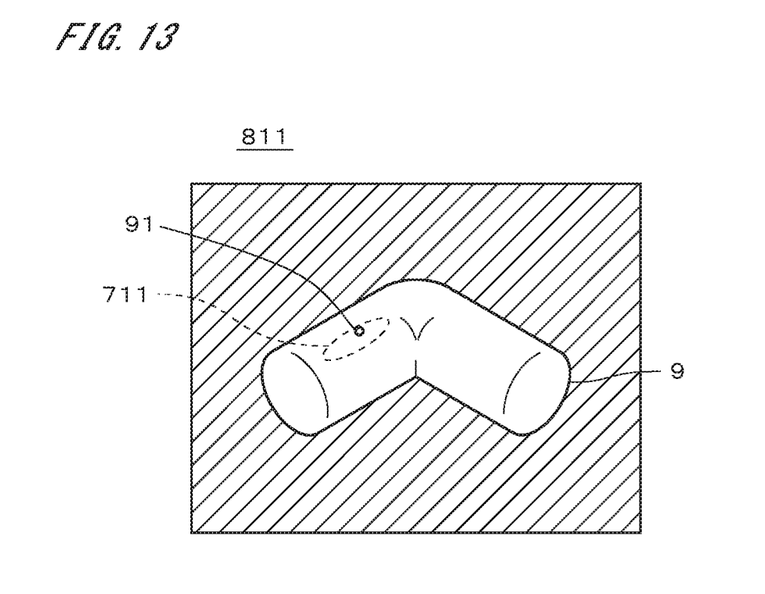
FIG. 13 is a view showing the first object image.
Figure 14:
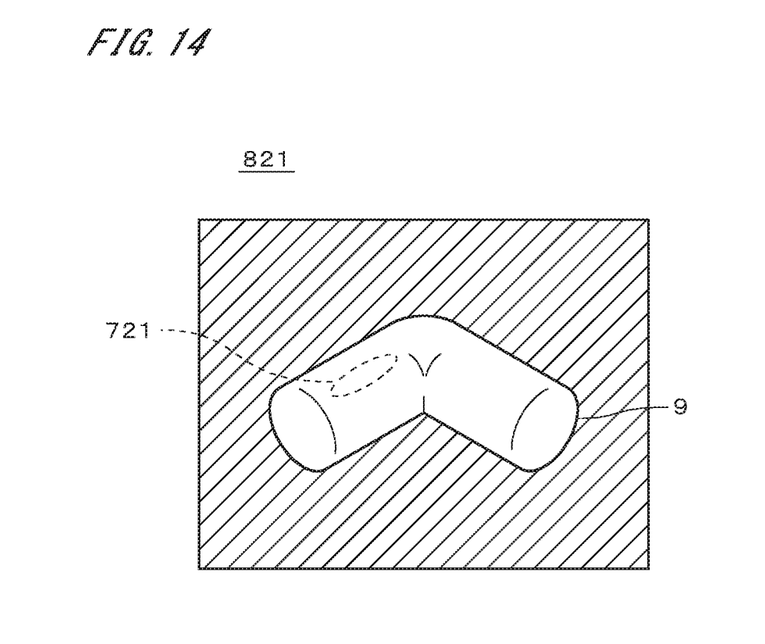
FIG. 14 is a view showing the first reference image.

Next, with reference to FIGS. 13 to 19, the characteristic feature of defect detection performed by the inspection apparatus 1 will be described specifically. FIG. 13 is a view showing one example of the first object image 811. The first object image 811 shows the object 9. There is a defect 91 on the object 9. In FIG. 13, reference numerals 9 and 91 are given to portions representing the object 9 and a defect 91 in the first object image 811, respectively. The same applies to the following figures. It is assumed that due to the lighting effect, the surrounding of the defect 91 is a spatially gently bright area 711 in the first object image 811. FIG. 14 is a view showing one example of the first reference image 821. There appears no defect in the first reference image 821. It is assumed that there appears a spatially gently bright area 721 also in the first reference image 821.

In each of the exemplary cases shown in FIGS. 13 and 14, since processing is performed on the entire image, the entire image may be recognized as one detection processing area. Part of the image may be masked and excluded from the detection processing area.

Figure 15:
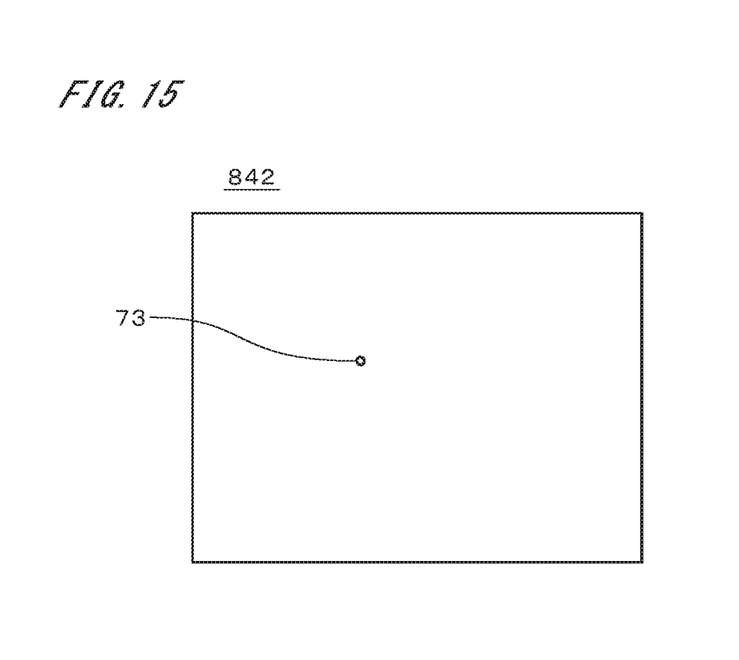
FIG. 15 is a view showing a differential binary image.

The object 9 is a metal component formed by forging and its surface is shot-blasted. The surface of the object 9 has a frosting metal gloss. When the bright areas 711 and 721 coincide with each other in these images, as shown in FIG. 15, a defect area 73 corresponding to only the defect 91 appears in a differential binary image 842 obtained by binarizing a simple differential absolute value image. On the other hand, when the object 9 has, for example, a surface which has been subjected to shotblasting again partially or on the whole, the roughness and/or the shape of the surface is slightly changed from the original shape. When the object 9 has a surface which is not mirror-finished but has a frosting metal gloss, even if the lighting condition is constant, the size and/or the position of the bright area is changed due to the reprocessing of shotblasting.

Figure 16:
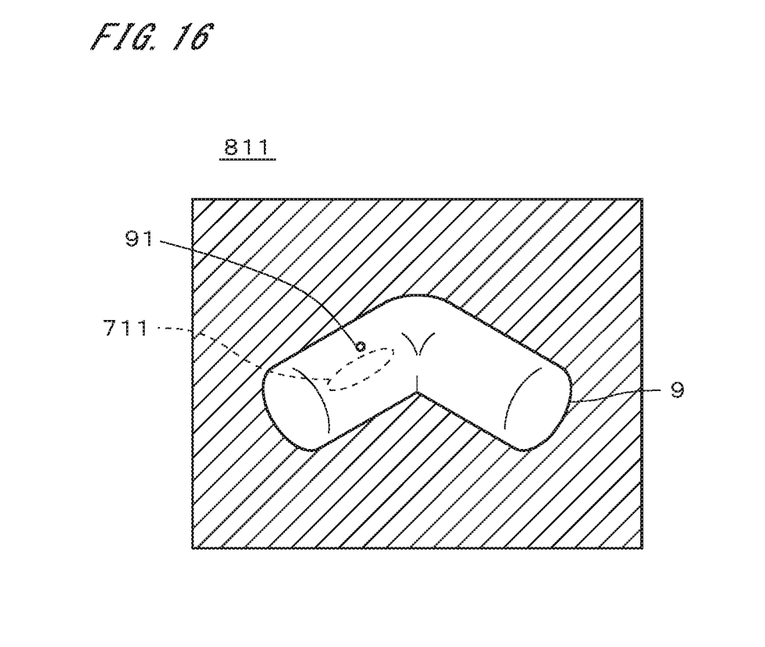
FIG. 16 is a view showing the first object image in which a bright area is changed.
Figure 17:
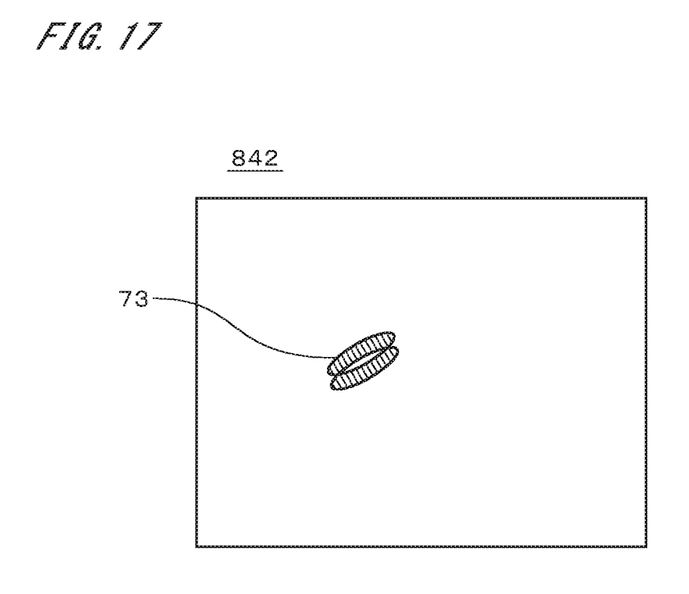
FIG. 17 is a view showing the differential binary image.

FIG. 16 is a view exemplarily showing the first object image 811 in which the bright area 711 is changed due to the reprocessing. When a differential absolute value image between the first object image 811 of FIG. 16 and the first reference image 821 of FIG. 14 is simply acquired and binarized, as shown in FIG. 17, a wide defect area 73 appears in the differential binary image 842. As a result, an existing area of the defect 91 is included in the defect area 73 and the detection of the defect 91 becomes difficult.

Figure 18:
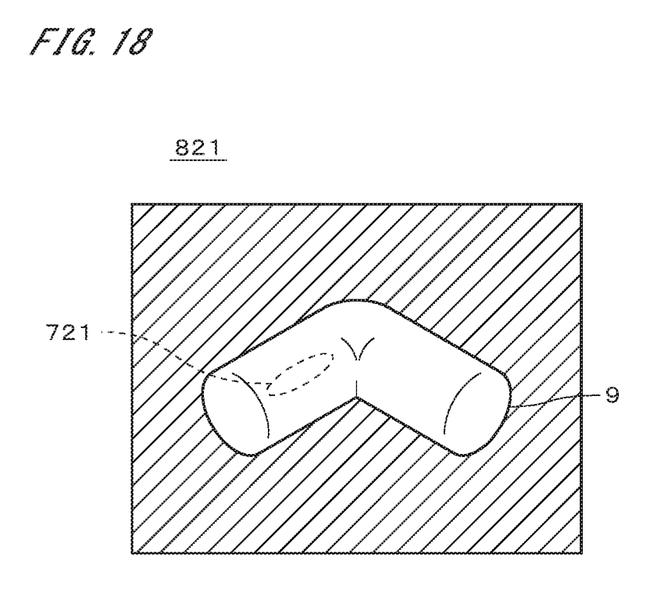
FIG. 18 is a view showing the corrected first reference image.
Figure 19:
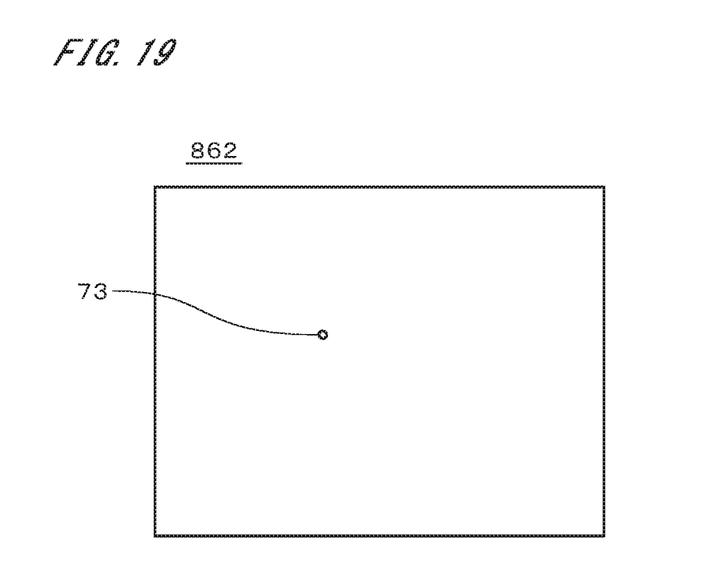
FIG. 19 is a view showing the differential binary image.

FIG. 18 is a view exemplarily showing the first reference image 821 corrected by the inspection apparatus 1 in Steps S14 and S15. An actual filter used for removal of low-frequency components has one side having 10 pixels or more, and as described earlier, the width and height of the filter are larger than at least several times those of the area in which the defect appears. By executing Steps S14 and S15, the low-frequency components of the first reference image 821 are matched to the low-frequency components of the first object image 811. As shown in FIG. 18, the bright area 721 in the first reference image 821 almost coincides with the bright area 711 in the first object image 811. As a result, by binarizing a differential image between the first object image 811 and the corrected first reference image 821, as shown in FIG. 19, acquired is a defect detection image 862 in which the defect appears as an appropriate defect area 73 (Step S16).

In Step S16, so-called shaking comparison may be adopted. In the shaking comparison, the first object image 811 or the corrected first reference image 821 is moved by a predetermined number of pixels (for example, one pixel) in each of eight directions from the relative position after the alignment, and a differential absolute value image between the first object image 811 and the corrected first reference image 821 after moving is obtained. Then, in a plurality of (herein nine) differential absolute value images, a minimum value among values of pixels at the same position is specified and an image in which the minimum value is given to the position is acquired as a result image of the shaking comparison process.

The result image is binarized by a predetermined threshold value and a binary defect detection image representing a defect area is thereby acquired. Further, the result image obtained by the shaking comparison process has only to be one derived from the above-described plurality of differential absolute value images, and for example, out of the plurality of differential absolute value images, a differential absolute value image in which the sum of values of pixels becomes minimum may be adopted as the defect detection image.

The inspection performed by the inspection apparatus 1 is suitable for a case where respective surface conditions of the object 9 which is processed first and the object 9 which is processed last are different from each other when the shape and/or the direction of the normal of the inspection area which is an object to be inspected, on the object 9, is slightly changed and the brightness and darkness in the corresponding area in the object image is thereby largely changed, or when a large number of objects 9 are processed. An exemplary inspection area is a shot-blasted or ground metal surface. A typical example is a surface which has been subjected to press working such as forging or the like and then rough surface processing.

In a case of the shot-blasted surface, though the surface condition of the object is slightly changed due to a change in the diameter of a projection material when a large number of objects are processed, by using the inspection apparatus 1, it is possible to perform inspection without changing the first reference image 821. Also in a case of the ground surface, though the surface condition of the object is slightly changed due to a change in the condition of a grindstone when a large number of objects are processed, by using the inspection apparatus 1, it is possible to perform inspection without changing the first reference image 821.

Further, in a case where the defect on the object 9 is modified by reprocessing of shotblasting or grinding, the shape and/or the tint of the object 9 is partially changed, and in some cases, many false defects are detected by the comparison. Though it is not impossible to prepare a new first reference image 821, the inspection on the reprocessed objects which are grouped needs further time and effort. In contrast to this case, by using the inspection apparatus 1, it is possible to perform inspection on the reprocessed object 9 without changing the first reference image 821.

The object 9 is not limited to a metal product. Only if the inspection area of the object 9 is a roughened surface having a gloss, the inspection apparatus 1 is suitable for the inspection of the object 9. It is preferable that the object 9 should have a frosted or satin-finished surface. As a material of the object 9, other than a metal, various materials such as resin, ceramic, cement, gypsum, or the like may be adopted.

Figure 20:
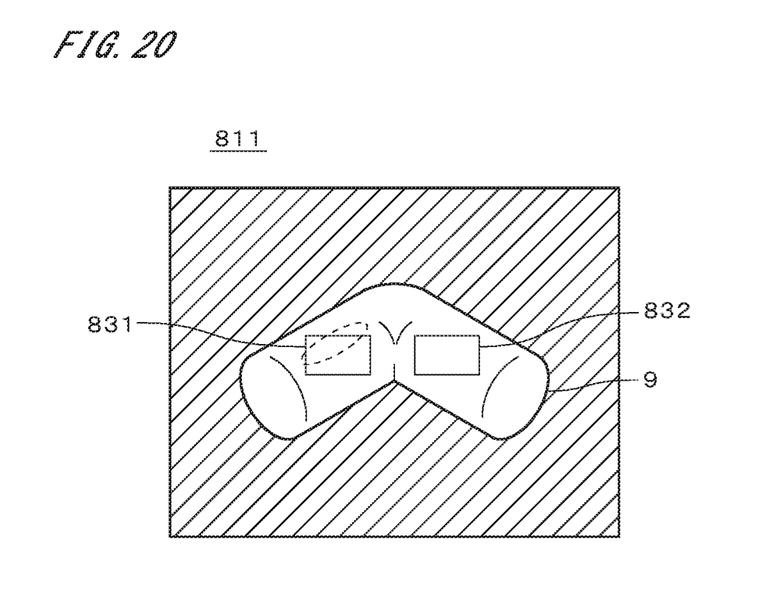
FIG. 20 is a view showing a plurality of detection processing areas.

FIG. 20 is a view used for explaining another exemplary function of the high-frequency component removing part 54. In the first object image 811 of FIG. 20, two detection processing areas 831 and 832 are set. Though not shown, also in the first reference image 821, like detection processing areas 831 and 832 are set. A filter applied by the high-frequency component removing part 54 on the respective detection processing areas 831 in the first object image 811 and the first reference image 821 is different from a filter by the high-frequency component removing part 54 on the respective detection processing areas 832 in the first object image 811 and the first reference image 821. The number of detection processing areas, i.e., the number of inspection areas on the object 9 may be three or more. Generally describing, the number of detection processing areas corresponding to the inspection areas is two or more, and there is a difference in the property of removal of high-frequency components between at least two detection processing areas, which is performed by the high-frequency component removing part 54. It is thereby possible to perform appropriate defect detection in accordance with the inspection area. The detection processing area in the first object image 811 does not need to coincide with the inspection area on the object 9 but may be an area including the inspection area (the area in the image, which corresponds to the inspection area, to be exact), or may be an area which partially overlaps the inspection area.

The phrase "there is a difference in the property of removal of high-frequency components" means, for example, that there is a difference in the size of the filter used to remove the high-frequency components, that there is a difference in the value set in the filter used to remove the high-frequency components, that there is a difference in the value of a computational variable used to remove the high-frequency components, or the like. Further, the high-frequency components do not need to be completely removed, and the removal of high-frequency components includes reduction of high-frequency components.

A high-frequency component removing filter removes the brightness and darkness in the first object image 811 due to the defect but preferably leaves the brightness and darkness due to a normal shape of the object 9 as much as possible. Usually, as illumination light enters the inspection area on the object 9 more obliquely, the brightness and darkness of the detection processing area in the first object image 811 and the first reference image 821 becomes more significant. Therefore, it is preferable that the size of the high-frequency component removing filter should become smaller as an angle formed by a direction of luminous flux of the illumination light going to the inspection area and the direction of the normal of the inspection area becomes larger.

Further, the angle formed by the direction of luminous flux of the illumination light and the direction of the normal of the inspection area (hereinafter, referred to as an "incident angle") does not need to be obtained with accuracy. Only if the magnitude relation in the incident angle of the illumination light can be determined on the basis of a relation between one inspection area and anther inspection area, the incident angle may be obtained by any one of various methods. The direction of luminous flux of the illumination light, for example, may be determined as a direction in which the light source is positioned with respect to the inspection area or an average direction of luminous flux. The direction of the normal of the inspection area may be determined as the direction of the normal in the center of the inspection area or an average direction of the normal of the inspection area.

The correction part 56 may use a "difference", instead of the "ratio" between a value of each pixel of the second object image 812 and a value of the corresponding pixel of the second reference image 822. In this case, the difference is added to or subtracted from a value of the corresponding pixel of the first object image 811 or the first reference image 821. Also in the case where the difference is used, since the low-frequency components are removed in the differential image between the corrected first object image 811 and the first reference image 821, the defect appears clearly. Further, the correction part 56 may use a corrected "ratio" in consideration of the terms and conditions, or may use a corrected "difference". Also the correction method using the "ratio" or the "difference" is not limited to multiplication and division or addition and subtraction, but may adopt more complicate computation.

In other words, the comparison part 55 corrects a value of each pixel of at least one of the first object image 811 and the first reference image 821 on the basis of a "discrepancy", which is the ratio or the difference, between a value of the corresponding pixel of the second object image 812 and a value of the corresponding pixel of the second reference image 822, and compares the first object image 811 with the first reference image 821, to thereby detect the defect area in the first object image 811. More exactly, in the comparison between these images, on the basis of the above-described "discrepancy", performed is the correction to match a value of a pixel of one image to a value of the corresponding pixel of the other image in the low-frequency level.

In the above-described inspection apparatus 1, various modifications can be made.

The configuration of the inspection apparatus 1 is not limited to the exemplary one shown in the above-described preferred embodiment. The number of light source parts may be one, and if the environment is bright, the light source part may not be provided. The number of image pickup parts may also be one. The number of or the arrangement of light source parts and image pickup parts may be changed in various manners.

The first object image 811 and the first reference image 821 may be monochrome images or color images. The object 9 does not need to be a three-dimensional one but may be a plate-like or film-like one.

The configurations in the above-discussed preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 Inspection apparatus
9 Object
51 Object image storage part
52 Reference image storage part
54 High-frequency component removing part
55 Comparison part
73 Defect area
83, 831, 832 Detection processing area
811 First object image
812 Second object image
821 First reference image
822 Second reference image
S12, S14 to S16 Step

The invention claimed is:

1. An inspection apparatus, comprising:
an object image storage part for storing therein a first object image obtained by picking up an image of an object;
a reference image storage part for storing therein a first reference image;
a high-frequency component removing part for removing high-frequency components from said first object image and said first reference image by performing a smoothing process on said first object image and said first reference image, respectively, to acquire a second object image and a second reference image, respectively; and
a comparison part for correcting a value of each pixel of at least one of said first object image and said first reference image on the basis of a discrepancy, which is a ratio or a difference, between a value of a corresponding pixel of said second object image and a value of a corresponding pixel of said second reference image, and then comparing said first object image with said first reference image, to detect a defect area in said first object image.

2. The inspection apparatus according to claim 1, wherein an inspection area on said object, in which a defect is to be detected, is a roughened surface having a gloss.

3. The inspection apparatus according to claim 2, wherein said inspection area is a shot-blasted or ground metal surface.

4. The inspection apparatus according to claim 1, wherein the number of detection processing areas which are targets of detecting a defect area in said first object image is two or more, and there is a difference in the property of removal of high-frequency components between at least two detection processing areas, said removal of high-frequency components being performed by said high-frequency component removing part.

5. The inspection apparatus according to claim 4, wherein said high-frequency component removing part removes high-frequency components from each detection processing area by applying a filter on said each detection processing area, and
the size of said filter becomes smaller as an angle formed by a direction of luminous flux of illumination light going to said inspection area and the direction of the normal of said inspection area becomes larger.

6. The inspection apparatus according to claim 1, wherein said a high-frequency component removing part performs the smoothing process on said first object image and said first reference image by applying a smoothing filter of a predetermined size on said first object image and said first reference image, respectively.

7. The inspection apparatus according to claim 1, wherein said a high-frequency component removing part performs the smoothing process on said first object image and said first reference image by performing a Fourier transform, removing high-frequency components, and then performing an inverse Fourier transform on said first object image and said first reference image, respectively.

8. An inspection method, comprising:
a) obtaining a first object image by picking up an image of an object;
b) acquiring a second object image and a second reference image by removing high-frequency components from said first object image and a first reference image, respectively, by performing a smoothing process on said first object image and said first reference image, respectively;
c) correcting a value of each pixel of at least one of said first object image and said first reference image on the basis of a discrepancy, which is a ratio or a difference, between a value of a corresponding pixel of said second object image and a value of a corresponding pixel of said second reference image; and
d) detecting a defect area in said first object image by comparing said first object image with said first reference image.

9. The inspection method according to claim 8, wherein an inspection area on said object, in which a defect is to be detected, is a roughened surface having a gloss.

10. The inspection method according to claim 9, wherein said inspection area is a shot-blasted or ground metal surface.

11. The inspection method according to claim 8, wherein the number of detection processing areas which are targets of detecting a defect area in said first object image is two or more, and there is a difference in the property of removal of high-frequency components between at least two detection processing areas in said operation b).

12. The inspection method according to claim 11, wherein high-frequency components are removed from each detection processing area by applying a filter on said each detection processing area in said operation b), and the size of said filter becomes smaller as an angle formed by a direction of luminous flux of illumination light going to said inspection area and the direction of the normal of said inspection area becomes larger.

13. The inspection method according to claim 8, wherein said smoothing process on said first object image and said first reference image is performed by applying a smoothing filter of a predetermined size on said first object image and said first reference image, respectively, in said operation b).

14. The inspection method according to claim 8, wherein said smoothing process on said first object image and said first reference image is performed by performing a Fourier transform, removing high-frequency components, and then performing an inverse Fourier transform on said first object image and said first reference image, respectively, in said operation b).

* * * * *